United States Patent
Dewangan et al.

(10) Patent No.: US 9,739,345 B2
(45) Date of Patent: Aug. 22, 2017

(54) MANUAL TRANSMISSION

(71) Applicant: GM Global Technology Operations LLC, Detroit, MI (US)

(72) Inventors: Yogesh Kumar Dewangan, Dhamtari (IN); Bhaskara Ch, Rajamundry (IN); Raphael Demelezi, Gerlingen (DE); Ganesan Sp, Avadi Chennai (IN)

(73) Assignee: GM Global Technology Operations, LLC, Detroit, MI (US)

( * ) Notice: Subject to any disclaimer, the term of this patent is extended or adjusted under 35 U.S.C. 154(b) by 314 days.

(21) Appl. No.: 14/660,210

(22) Filed: Mar. 17, 2015

(65) Prior Publication Data

US 2016/0273619 A1    Sep. 22, 2016

(51) Int. Cl.
*F16H 3/093*    (2006.01)

(52) U.S. Cl.
CPC ..... *F16H 3/093* (2013.01); *F16H 2003/0931* (2013.01); *F16H 2200/0056* (2013.01)

(58) Field of Classification Search
CPC .. F16H 61/684; F16H 61/702; F16H 59/0217; F16H 37/043; F16H 61/682; F16H 59/02; F16H 59/0278; F16H 63/42; F16H 2063/426; F16H 3/093; F16H 3/097; F16H 61/0021; B60K 35/00; B60Y 2200/221

See application file for complete search history.

(56) References Cited

U.S. PATENT DOCUMENTS

| | | | | |
|---|---|---|---|---|
| 3,589,483 | A | * | 6/1971 | Smith ..... F16H 3/097 192/3.52 |
| 2013/0043086 | A1 | * | 2/2013 | Weaver ..... F16H 61/0021 180/165 |
| 2016/0273619 | A1 | * | 9/2016 | Dewangan ..... F16H 3/093 |

FOREIGN PATENT DOCUMENTS

| | | | | |
|---|---|---|---|---|
| DE | 102011118151 A1 | * | 5/2013 | ..... F16H 3/093 |
| JP | 2013213569 A | * | 10/2013 | ..... F16H 3/093 |
| KR | 100902719 B1 | * | 6/2009 | ..... F16H 3/093 |

* cited by examiner

*Primary Examiner* — Victor MacArthur

(57) ABSTRACT

A transmission includes a transmission housing, five co-planar gear sets, a transmission input shaft, an output member, a first and second countershaft, and five synchronizer assemblies. The five synchronizer assemblies are selectively engaged to establish one of at least seven forward speed ratios and one reverse speed ratio between the transmission input shaft member and the output member.

20 Claims, 2 Drawing Sheets

| Gear | Ratio | Step ratio |
|---|---|---|
| 1st gear | 4.273 | |
| 2nd gear | 2.353 | 1.816 |
| 3rd gear | 1.571 | 1.497 |
| 4th gear | 1.179 | 1.332 |
| 5th gear | 0.914 | 1.290 |
| 6th gear | 0.718 | 1.273 |
| 7th gear | 0.564 | 1.273 |
| Reverse gear | 3.818 | |

MANUAL TRANSMISSION

TECHNICAL FIELD

The present disclosure relates to transmissions and more particularly to a compact, manual transmission having three axes to establish at least seven gear speeds and a reverse gear speed.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having a transmission housing, a first, second, third, fourth, and fifth co-planar gear sets, a transmission input shaft member, an output member, a first and second countershafts, and five synchronizer assemblies. The first, second, and fifth co-planar gear sets each include a first gear in mesh with a second gear and the third and fourth co-planar gear sets include a first gear in mesh with a second and a third gear. The transmission input shaft member is rotatably supported in the transmission housing. The first gear of each of the co-planar gear sets is rotatably fixed for common rotation with the transmission input shaft member. The output member is rotatably supported in the transmission housing. The first countershaft is rotatably supported within the transmission housing and spaced apart from and parallel with the transmission input shaft member. The second gear of each of the co-planar gear sets is selectively connectable for common rotation with the first countershaft. The second countershaft is rotatably supported within the transmission housing and spaced apart from and parallel with the transmission input shaft member. Each of the third gears of the third and fourth gear sets are selectively connectable for common rotation with the second countershaft. The five synchronizer assemblies each selectively couple at least one of the second and third gears of the co-planar gear sets with one of the first countershaft and the second countershaft. The selective engagement of one of the five synchronizer assemblies establishes one of at least seven forward speed ratios and one reverse speed ratio between the transmission input shaft member and the output member.

In one example of the present invention, the first co-planar gear set further includes a third gear meshing with the second gear of the first gear set and the third gear is selectively connectable for common rotation with the second countershaft.

In another example of the present invention, the transmission further includes a first and a second transfer gears. The first transfer gear is connected for common rotation with the first countershaft. The second transfer gear is connected for common rotation with the second countershaft. The output member is an output gear. The first transfer gear meshes with the output gear. The second transfer gear meshes with the output gear.

In yet another example of the present invention, a first of the five synchronizer assemblies selectively connects one of the second gears of the first and second co-planar gear sets to the first countershaft.

In yet another example of the present invention, a second of the five synchronizer assemblies selectively connects one of the second gears of the third and fourth co-planar gear sets to the first countershaft.

In yet another example of the present invention, a third of the five synchronizer assemblies selectively connects the second gear of the fifth gear set to the first countershaft.

In yet another example of the present invention, a fourth of the five synchronizer assemblies selectively connects one of the third gear of the third and fourth gear sets to the second countershaft.

In yet another example of the present invention, a fifth of the five synchronizer assemblies selectively connects the third gear of the first gear set to the first countershaft.

In yet another example of the present invention, the transmission housing includes a first and a second support wall. The first gear set is adjacent the first support wall. The second gear set is adjacent the first gear set. The third gear set is adjacent the second gear set. The fourth gear set is adjacent the third gear set. The fifth gear set is adjacent the fourth gear set and the second support wall.

In yet another example of the present invention, the first gear set provides a first forward and a reverse speed ratio. The second gear set provides a second forward speed ratio. The third gear set provides a third and a fifth speed ratios. The fourth gear set provides a fourth and a sixth forward speed ratios. The seventh gear set provides a seventh forward speed ratio.

The above features and advantages and other features and advantages of the present invention are readily apparent from the following detailed description of the best modes for carrying out the invention when taken in connection with the accompanying drawings.

BRIEF DESCRIPTION OF THE DRAWING

FIG. 2 is an exemplary gear chart diagram of a seven speed manual transmission in accordance with the present invention.

DESCRIPTION

Figure 1:
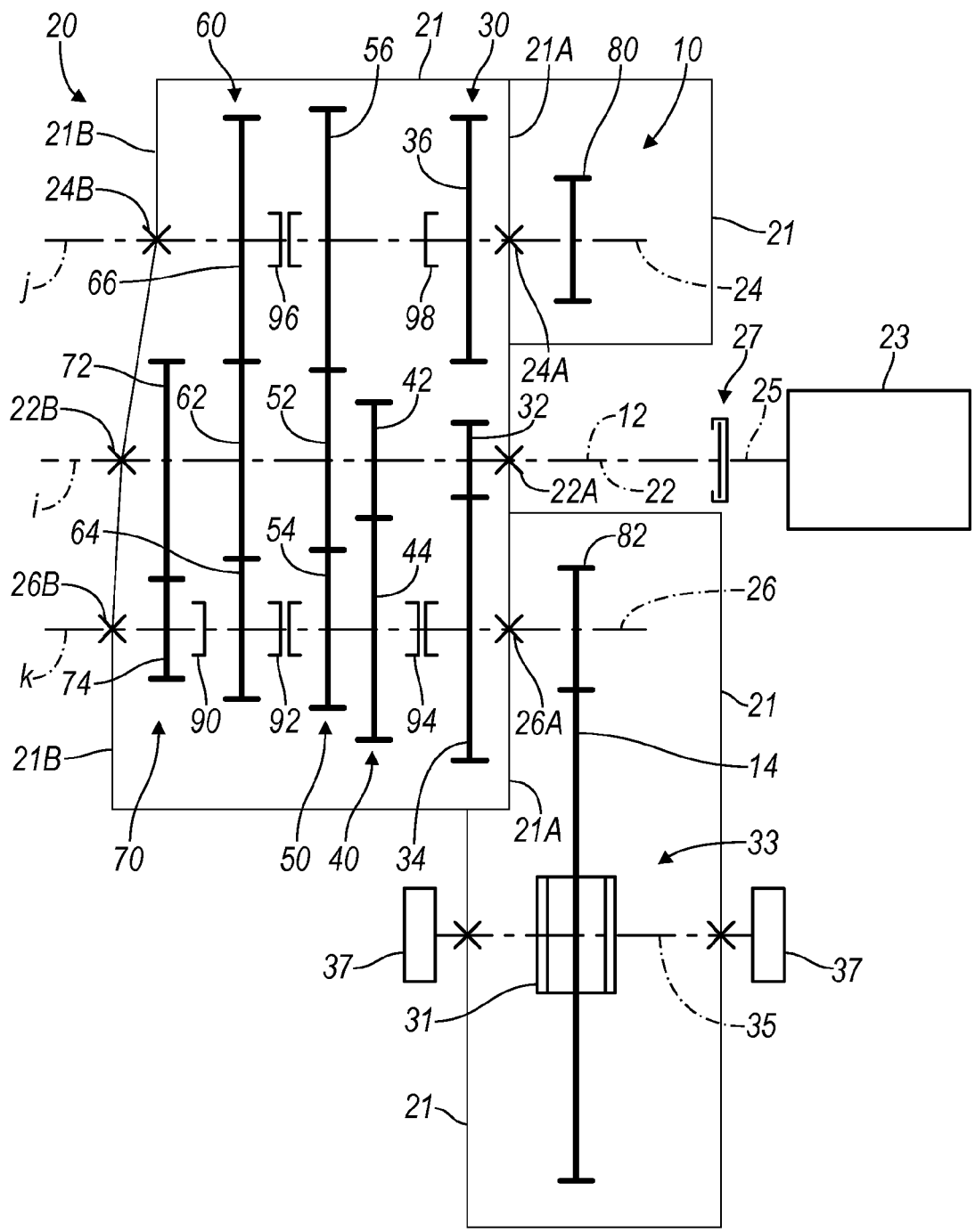
FIG. 1 is a schematic diagram of an example of a seven speed manual transmission, in accordance with the present invention.

Referring to FIG. 1, a multiple speed manual transmission generally indicated by reference number 10 is illustrated and will now be described. The transmission 10 includes an input member 12, an output member 14 and a gearing arrangement 20 at least partially enclosed by a housing 21. The input member 12 may be separate from the transmission 10 and is selectively connectable to an output member 25 of an engine 23 through a manually activated clutch 27. The input member 12 may be further isolated from the output member 25 of the engine 23 through a flywheel or damper (not shown) to improve vibration transmission from the engine 23 to the transmission 10. The output member 14 is directly connected for common rotation with a differential 31 of a differential assembly 33 which transfers torque from the output member to an axle 35 and therefore a set of wheels 37.

The gearing arrangement 20 includes various shafts or members, co-planar intermeshing gear sets, and selectively engageable synchronizers, as will be described herein. For example, the gearing arrangement 20 includes a transmission input shaft 22, a first countershaft 24 and a second countershaft 26. The first and second countershafts 24, 26 are spaced apart from and parallel with the first transmission input shaft 22. The first transmission input shafts 22 define a first axis of rotation i, the first countershaft 24 defines a second axis of rotation j and the second countershaft 26 defines a third axis of rotation k.

The transmission input shaft 22 and countershafts 24, 26 are rotatably supported in the housing 21 through a plurality of bearings. For example, the transmission input shaft 22 is rotatably supported by the housing 21 through bearings 22A, 22B. The first countershaft 24 is rotatably supported by the housing 21 through bearings 24A, 24B. The second countershaft 26 is rotatably supported by the housing 21 through bearings 26A, 26B.

The gearing arrangement 20 also includes a first, second, third, fourth, and fifth co-planar, intermeshing gear sets 30, 40, 50, 60, and 70. Some of the co-planar gear sets include a pair of intermeshing gears while other co-planar gear sets have three intermeshing gears. For example, the second and fifth co-planar gear sets 40, 70 each include a pair of intermeshing gears. The first, third, and fourth co-planar gear sets 30, 50, 60 each include three intermeshing gears.

The first co-planar gear set 30 includes a drive gear 32, a driven gear 34, and a reverse gear 36. Drive gear 32 is rotatably fixed and connected for common rotation with the transmission input shaft 22 and intermeshes with the driven gear 34. Driven gear 34 is selectively connectable for common rotation with the second countershaft member 26. Reverse gear 36 is selectively connectable for common rotation with the first countershaft member 24 and intermeshes with the driven gear 34. The first co-planar gear set 30 is disposed adjacent an end wall 21A of the housing 21.

The second co-planar gear set 40 includes a drive gear 42 and a driven gear 44. The drive gear 42 is rotatably fixed and connected for common rotation with the transmission input shaft 22 and intermeshes with the driven gear 44. The driven gear 44 is selectively connectable for common rotation with the second countershaft member 26. The second co-planar gear set 40 is positioned adjacent to the first co-planar gear set 30.

The third co-planar gear set 50 includes a drive gear 52, a first driven gear 54, and a second driven gear 56. The drive gear 52 is rotatably fixed and connected for common rotation with the transmission input shaft 22 and intermeshes with each of the first and second driven gears 54, 56. The first driven gear 54 is selectively connectable for common rotation with the second countershaft 26. The second driven gear 56 is selectively connectable for common rotation with the first countershaft 24. The third co-planar gear set 50 is positioned adjacent to the second gear set 40.

The fourth co-planar gear set 60 includes a drive gear 62 and a first driven gear 64 and a second driven gear 66. The drive gear 62 is rotatably fixed and connected for common rotation with the transmission input shaft 22 and intermeshes with the first and second driven gears 64, 66. The first driven gear 64 is selectively connectable for common rotation with the second countershaft member 26. The second driven gear 66 is selectively connectable for common rotation with the first countershaft member 24. The fourth co-planar gear set 60 is positioned adjacent to the third co-planar gear set 50.

The fifth co-planar gear set 70 includes a drive gear 72 and a driven gear 74. The drive gear 72 is rotatably fixed and connected for common rotation with the transmission input shaft 22 and intermeshes with the driven gear 74. The driven gear 74 is selectively connectable for common rotation with the second countershaft member 26. The fifth co-planar gear set 70 is positioned between an end wall 21B of the housing 21 and the fourth co-planar gear set 60.

The gearing arrangement 20 also includes a first and a second countershaft transfer gears 80, 82. The first countershaft transfer gear 80 is rotatably fixed and connected for common rotation with the first countershaft member 24. The second countershaft transfer gear 82 is rotatably fixed and connected for common rotation with the second countershaft member 26. Each of the transfer gears 80, 82 are disposed within the transmission housing 21 without departing from the scope of the invention. The first countershaft transfer gear 80 and second countershaft transfer gear 82 are configured to mesh with output member 14. However, the first countershaft transfer gear 80 and the second countershaft transfer gear 82 do not mesh with each other. The first countershaft transfer gear 80 is disposed adjacent to and on the opposite side of the bearing 24A from the reverse gear 36 of the first co-planar gear set 30. The second countershaft transfer gear 82 is disposed adjacent to and on the opposite side of the bearing 26A from the driven gear 34 of the first co-planar gear set 30. The output member 14 is co-planar with first and second countershaft transfer gears 80, 82.

The transmission 10 further includes a first, second, third, fourth, and fifth selectively actuatable synchronizer assemblies 90, 92, 94, 96, 98. The first and fifth synchronizers 90, 98 are a single sided synchronizer that generally includes a shift fork (not shown) that is bi-directionally translated by an actuator (not shown) into either an engaged position or a neutral or disengaged position. In the present example, the first synchronizer 90 is selectively actuatable to connect the driven gear 74 to the second countershaft 26 for common rotation with the second countershaft 26. The fifth synchronizer 98 is selectively actuatable to connect the reverse gear 36 to the first countershaft 24 for common rotation with the first countershaft 24. The second, third, and fourth synchronizers 92, 94, 96 are double sided synchronizers each of which generally include a shift fork (not shown) that is bi-directionally translated by an actuator (not shown) into at least two engaged positions and a neutral or disengaged position. In the present example, the second synchronizer 92 is selectively actuatable to connect one of the second driven gear 54 of the third co-planar gear set 50 and the second driven gear 64 of the fourth co-planar gear set 60 to the second countershaft 26 for common rotation with the second countershaft 26. The third synchronizer 94 is selectively actuatable to connect one of the second driven gear 34 of the first co-planar gear set 30 and the second driven gear 44 of the second co-planar gear set 40 to the second countershaft 26 for common rotation with the second countershaft 26. The fourth synchronizer 96 is selectively actuatable to connect one of the third driven gear 66 of the fourth co-planar gear set 60 and the third driven gear 56 of the third co-planar gear set 50 to the first countershaft 24 for common rotation with the first countershaft 24.

Referring now to FIG. 2 with continuing reference to FIG. 1, the gear ratios of the transmission 10 are detailed and will now be described. The transmission 10 is capable of transmitting torque from the input shaft member 12 to the output member 14 in at least seven forward torque ratios and at least one reverse torque ratio. Each of the forward torque ratios and the reverse torque ratio is attained by selective engagement of one or more of the synchronizer assemblies 90, 92, 94, 96, 98. Those skilled in the art will readily understand that a different speed ratio is associated with each torque ratio.

It should be appreciated that each individual gear set 30, 40, 50, 60, 70 provides one or more forward and/or reverse gear ratios upon selective engagement of the synchronizer assemblies 90, 92, 94, 96, 98. However, which synchronizer and which gear set are associated with a particular forward or reverse speed ratio may vary without departing from the scope of the present invention.

For example, to establish the reverse torque ratio, the manual clutch 27 is engaged to couple the engine output member 25 to the transmission input shaft 22 and the fifth synchronizer 98 is engaged to connect the reverse gear 36 of the first co-planar gear set 30 to the first countershaft 24. More specifically, input torque from the transmission input shaft 22 is transferred through the drive gear 32 of the first co-planar gear set 30, to the driven gear 34, and to the reverse gear 36, through the reverse gear 36 to the first countershaft 24, through the first countershaft 24 to the first transfer gear 80, to the output member 14 and from the output member 14 to the differential 31 of the differential assembly 33.

To establish a first forward torque ratio (i.e. a 1st gear), the manual clutch 27 is engaged to couple the engine output member 25 to the transmission input shaft 22 which rotates the drive gear 32 of the first co-planar gear set 30 and the third synchronizer 94 is activated to couple the second gear 34 of the first co-planar gear set 30 to the second countershaft 26. More specifically, input torque from the transmission input shaft 22 is transferred to the drive gear 32. The drive gear 32 transfers torque to the first driven gear 34 which transfers the torque to the second countershaft 26 through the third synchronizer 94, from the second countershaft 26 to the second transfer gear 82, from the second transfer gear 82 to the output member 14 and from the output member 14 to the differential 31 of the differential assembly 33.

To establish a second forward torque ratio (i.e. a 2nd gear), the manual clutch 27 is engaged to couple the engine output member 25 to the transmission input shaft 22 which rotates the drive gear 42 of the second co-planar gear set 40 and the third synchronizer 94 is activated to couple the driven gear 44 of the second co-planar gear set 40 to the second countershaft member 26. Accordingly, input torque from the transmission input shaft 22 is transferred to the drive gear 42 of the second co-planar gear set 40. The drive gear 42 of the second co-planar gear set 40 transfers torque to the driven gear 44 of the second co-planar gear set 40 which transfers the torque to the second countershaft 26 through the third synchronizer 94, from the second countershaft 26 to the second transfer gear 82, from the second transfer gear 82 to the output member 14 and from the output member 14 to the differential 31 of the differential assembly 33.

To establish a third forward torque ratio (i.e. a 3rd gear), the manual clutch 27 is engaged to couple the engine output member 25 to the transmission input shaft 22 which rotates the drive gear 52 of the third co-planar gear set 50 and the fourth synchronizer 96 is activated to couple the second driven gear 56 of the third co-planar gear set 50 to the first countershaft member 24. Accordingly, input torque from the transmission input shaft 22 is transferred to the drive gear 52 of the third co-planar gear set 50. The drive gear 52 of the third co-planar gear set 50 transfers torque to the second driven gear 56 of the third co-planar gear set 50 which transfers the torque to the first countershaft member 24 through the fourth synchronizer 96, from the first countershaft 24 to the first transfer gear 80, from the first transfer gear 80 to the output member 14 and from the output member 14 to the differential 31 of the differential assembly 33.

To establish a fourth forward torque ratio (i.e. a 4th gear), the manual clutch 27 is engaged to couple the engine output member 25 to the transmission input shaft 22 which rotates the drive gear 62 of the fourth co-planar gear set 60 and the fourth synchronizer 96 is activated to couple the second driven gear 66 of the fourth co-planar gear set 60 to the first countershaft member 24. Accordingly, input torque from the transmission input shaft 22 is transferred to the drive gear 62 of the fourth co-planar gear set 60. The drive gear 62 of the fourth co-planar gear set 60 transfers torque to the second driven gear 66 of the fourth co-planar gear set 60 which transfers the torque to the first countershaft 24 through the fourth synchronizer 96 from the first countershaft 24 to the first transfer gear 80, from the first transfer gear 80 to the output member 14 and from the output member 14 to the differential 31 of the differential assembly 33.

To establish a fifth forward torque ratio (i.e. a 5th gear), the manual clutch 27 is engaged to couple the engine output member 25 to the transmission input shaft 22 which rotates the drive gear 52 of the third co-planar gear set 50 and the second synchronizer 92 is activated to couple the first driven gear 54 of the third co-planar gear set 50 to the second countershaft member 26. Accordingly, input torque from the transmission input shaft 22 is transferred to the drive gear 52 of the third co-planar gear set 50. The drive gear 52 of the third co-planar gear set 50 transfers torque to the first driven gear 54 of the third co-planar gear set 50 which transfers the torque to the second countershaft 26 through the second synchronizer 92, from the second countershaft 26 to the second transfer gear 82, from the second transfer gear 82 to the output member 14 and from the output member 14 to the differential 31 of the differential assembly 33.

To establish a sixth forward torque ratio (i.e. a 6th gear), the manual clutch 27 is engaged to couple the engine output member 25 to the transmission input shaft 22 which rotates the drive gear 62 of the fourth co-planar gear set 60 and the second synchronizer 92 is activated to couple the first driven gear 64 of the fourth co-planar gear set 60 to the second countershaft member 26. Accordingly, input torque from the transmission input shaft 22 is transferred to the drive gear 62 of the fourth co-planar gear set 60. The drive gear 62 of the fourth co-planar gear set 60 transfers torque to the first driven gear 64 of the fourth co-planar gear set 60 which transfers the torque to the second countershaft 26 through the second synchronizer 92 from the second countershaft 26 to the second transfer gear 82, from the second transfer gear 82 to the output member 14 and from the output member 14 to the differential 31 of the differential assembly 33.

To establish a seventh forward torque ratio (i.e. a 7th gear), the manual clutch 27 is engaged to couple the engine output member 25 to the transmission input shaft 22 which rotates the drive gear 72 of the fifth co-planar gear set 70 and the first synchronizer 90 is activated to couple the driven gear 74 of the fifth co-planar gear set 70 to the second countershaft member 26. Accordingly, input torque from the transmission input shaft 22 is transferred to the drive gear 72 of the fifth co-planar gear set 70. The drive gear 72 of the fifth co-planar gear set 70 transfers torque to the driven gear 74 of the fifth co-planar gear set 70 which transfers the torque to the second countershaft 26 through the first synchronizer 90 from the second countershaft 26 to the second transfer gear 82, from the second transfer gear 82 to the output member 14 and from the output member 14 to the differential 31 of the differential assembly 33.

Again, it should be appreciated that any one of the gear sets 30, 40, 50, 60, 70 may be changed to produce a certain forward and reverse torque ratio without departing from the scope of the present invention.

The present invention contemplates that a variety of torque ratios (i.e., the ratio of torque of the output member 14 to the input member 12) are achievable through the selection of tooth counts of the gears of the transmission 10. This arrangement provides the opportunity to achieve reduced transmission length in comparison with other transmissions.

While the best modes for carrying out the invention have been described in detail, those familiar with the art to which this invention relates will recognize various alternative designs and examples for practicing the invention within the scope of the appended claims.

The following is claimed:

1. A transmission comprising:
   a transmission housing;
   a first, second, third, fourth, and fifth co-planar gear sets, wherein each of the first, second, and fifth co-planar gear sets include a first gear in mesh with a second gear, the first gear set includes a third gear in mesh with the second gear, and the third and fourth co-planar gear sets include a first gear in mesh with a second and a third gear;
   a transmission input shaft member rotatably supported in the transmission housing and wherein the first gear of each of the co-planar gear sets is rotatably fixed for common rotation with the transmission input shaft member;
   an output member rotatably supported in the transmission housing;
   a first countershaft rotatably supported within the transmission housing and spaced apart from and parallel with the transmission input shaft member, wherein the second gear of each of the co-planar gear sets is selectively connectable for common rotation with the first countershaft;
   a second countershaft rotatably supported within the transmission housing and spaced apart from and parallel with the transmission input shaft member, wherein each of the third gear of the first, third and fourth gear sets are selectively connectable for common rotation with the second countershaft, and
   five synchronizer assemblies each for selectively coupling at least one of the second and third gears of the co-planar gear sets with one of the first and second countershafts; and
   wherein the selective engagement of one of the five synchronizer assemblies establishes one of at least seven forward speed ratios and one reverse speed ratio between the transmission input shaft member and the output member.

2. The transmission of claim 1 further including a first and a second transfer gears, and wherein the first transfer gear is connected for common rotation with the first countershaft, the second transfer gear is connected for common rotation with the second countershaft, the output member is an output gear, the first transfer gear meshes with the output gear, and the second transfer gear meshes with the output gear.

3. The transmission of claim 1 wherein a first of the five synchronizer assemblies selectively connects one of the second gears of the first and second co-planar gear sets to the first countershaft.

4. The transmission of claim 3 wherein a second of the five synchronizer assemblies selectively connects one of the second gears of the third and fourth co-planar gear sets to the first countershaft.

5. The transmission of claim 4 wherein a third of the five synchronizer assemblies selectively connects the second gear of the fifth gear set to the first countershaft.

6. The transmission of claim 5 wherein a fourth of the five synchronizer assemblies selectively connects one of the third gear of the third and fourth gear sets to the second countershaft.

7. The transmission of claim 6 wherein a fifth of the five synchronizer assemblies selectively connects the third gear of the first gear set to the first countershaft.

8. The transmission of claim 7 wherein the transmission housing includes a first and a second support wall, and wherein the first gear set is adjacent the first support wall, the second gear set is adjacent the first gear set, the third gear set is adjacent the second gear set, the fourth gear set is adjacent the third gear set, the fifth gear set is adjacent the fourth gear set and the second support wall.

9. The transmission of claim 1 wherein the first gear set provides a first forward and a reverse speed ratio, the second gear set provides a second forward speed ratio, the third gear set provides a third and a fifth speed ratios, the fourth gear set provides a fourth and a sixth forward speed ratios, and the fifth gear set provides a seventh forward speed ratio.

10. A transmission comprising:
    a transmission housing;
    a first, second, third, fourth, and fifth co-planar gear sets, wherein each of the first, second, and fifth gear sets include a first gear in mesh with a second gear, the third and fourth gear sets include a first gear in mesh with a second and a third gear, and the first co-planar gear set includes a third gear in mesh with the second gear of the first co-planar gear set;
    a transmission input shaft member rotatably supported in the transmission housing and wherein the first gear of each of the co-planar gear sets is rotatably fixed for common rotation with the transmission input shaft member;
    an output gear rotatably supported in the transmission housing;
    a first countershaft rotatably supported within the transmission housing and paced apart from and parallel with the transmission input shaft member, and wherein the second gear of each of the co-planar gear sets is selectively connectable for common rotation with the first countershaft;
    a second countershaft rotatably supported within the transmission housing and spaced apart from and parallel with the transmission input shaft member, and wherein each of the third gear of the first, third, and fourth gear sets are selectively connectable for common rotation with the second countershaft;
    a first and a second transfer gears, and wherein the first transfer gear is connected for common rotation with the first countershaft, the second transfer gear is connected for common rotation with the second countershaft, and the first and second transfer gears mesh with the output gear, and five synchronizer assemblies each for selectively coupling at least one of the second and third gears of the co-planar gear sets with one of the first countershaft and the second countershaft; and wherein the selective engagement of one of the five synchronizer assemblies establishes one of at least seven forward speed ratios and one reverse speed ratio between the transmission input shaft member and the output member.

11. The transmission of claim 10 wherein a first of the five synchronizer assemblies selectively connects one of the second gears of the first and second co-planar gear sets to the first countershaft.

12. The transmission of claim 11 wherein a second of the five synchronizer assemblies selectively connects one of the second gears of the third and fourth co-planar gear sets to the first countershaft.

13. The transmission of claim 12 wherein a third of the five synchronizer assemblies selectively connects the second gear of the fifth gear set to the first countershaft.

14. The transmission of claim 13 wherein a fourth of the five synchronizer assemblies selectively connects one of the third gear of the third and fourth gear sets to the second countershaft.

15. The transmission of claim 14 wherein a fifth of the five synchronizer assemblies selectively connects the third gear of the first gear set to the first countershaft.

16. The transmission of claim 15 wherein the transmission housing includes a first and a second support wall, and wherein the first gear set is adjacent the first support wall, the second gear set is adjacent the first gear set, the third gear set is adjacent the second gear set, the fourth gear set is adjacent the third gear set, the fifth gear set is adjacent the fourth gear set and the second support wall.

17. The transmission of claim 16 wherein the first gear set provides a first forward and a reverse speed ratio, the second gear set provides a second forward speed ratio, the third gear set provides a third and a fifth speed ratios, the fourth gear set provides a fourth and a sixth forward speed ratios, and the fifth gear set provides a seventh forward speed ratio.

18. A transmission comprising:
a transmission housing;
a first, second, third, fourth, and fifth co-planar gear sets, wherein each of
the first, second, and fifth gear sets include a first gear in mesh with a second gear, the third and fourth gear sets include a first gear in mesh with a second and a third gear, and the first co-planar gear set includes a third gear in mesh with the second gear of the first co-planar gear set;
a transmission input shaft member rotatably supported in the transmission housing and wherein the first gear of each of the co-planar gear sets is rotatably fixed for common rotation with the transmission input shaft member;
an output gear rotatably supported in the transmission housing;
a first countershaft rotatably supported within the transmission housing and spaced apart from and parallel with the transmission input shaft member, and wherein the second gear of each of the co-planar gear sets is selectively connectable for common rotation with the first countershaft;
a second countershaft rotatably supported within the transmission housing and spaced apart from and parallel with the transmission input shaft member, and wherein each of the third gear of the first, third, and fourth gear sets are selectively connectable for common rotation with the second countershaft;
a first and a second transfer gears, and wherein the first transfer gear is connected for common rotation with the first countershaft, the second transfer gear is connected for common rotation with the second countershaft, and the first and second transfer gears mesh with the output gear;
a first synchronizer assembly selectively connecting one of the second gears of the first and second co-planar gear sets to the first countershaft;
a second synchronizer assembly selectively connecting one of the second gears of the third and fourth co-planar gear sets to the first countershaft;
a third synchronizer assembly selectively connecting the second gear of the fifth gear set to the first countershaft,
a fourth synchronizer assembly selectively connecting one of the third gear of the third and fourth gear sets to the second countershaft; and
a fifth synchronizer assembly selectively connecting the third gear of the first gear set to the first countershaft; and
wherein the selective engagement of one of the five synchronizer assemblies establishes one of at least seven forward speed ratios and one reverse speed ratio between the transmission input shaft member and the output member.

19. The transmission of claim 18 wherein the transmission housing includes a first and a second support wall, and wherein the first gear set is adjacent the first support wall, the second gear set is adjacent the first gear set, the third gear set is adjacent the second gear set, the fourth gear set is adjacent the third gear set, the fifth gear set is adjacent the fourth gear set and the second support wall.

20. The transmission of claim 19 wherein the first gear set provides a first forward and a reverse speed ratio, the second gear set provides a second forward speed ratio, the third gear set provides a third and a fifth speed ratios, the fourth gear set provides a fourth and a sixth forward speed ratios, and the fifth gear set provides a seventh forward speed ratio.

* * * * *